A. EICHHORN.
GREENHOUSE CONSTRUCTION.
APPLICATION FILED JULY 5, 1913.
1,101,418.
Patented June 23, 1914.
4 SHEETS—SHEET 2.
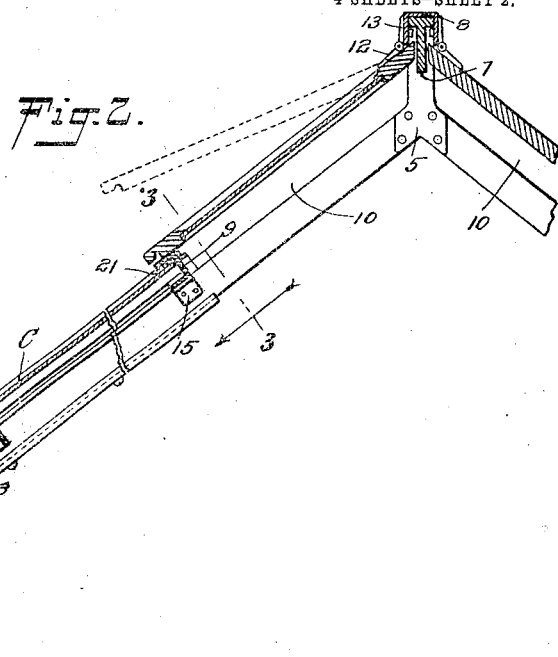
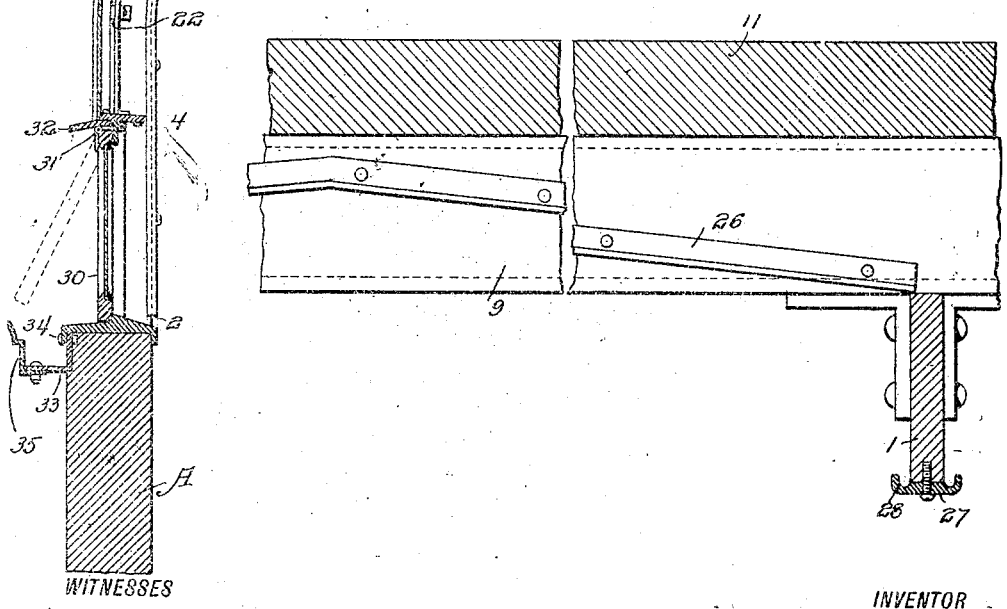
WITNESSES
INVENTOR
Augustus Eichhorn
BY
ATTORNEYS A. EICHHORN.
GREENHOUSE CONSTRUCTION.
APPLICATION FILED JULY 5, 1913.
1,101,418.
Patented June 23, 1914.
4 SHEETS—SHEET 3.
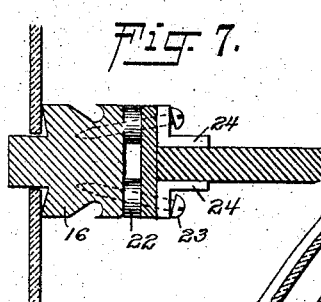
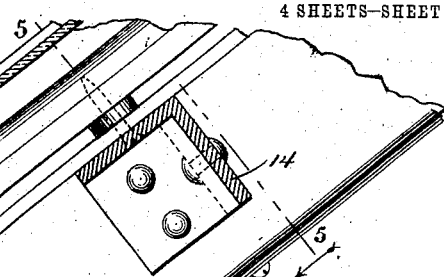
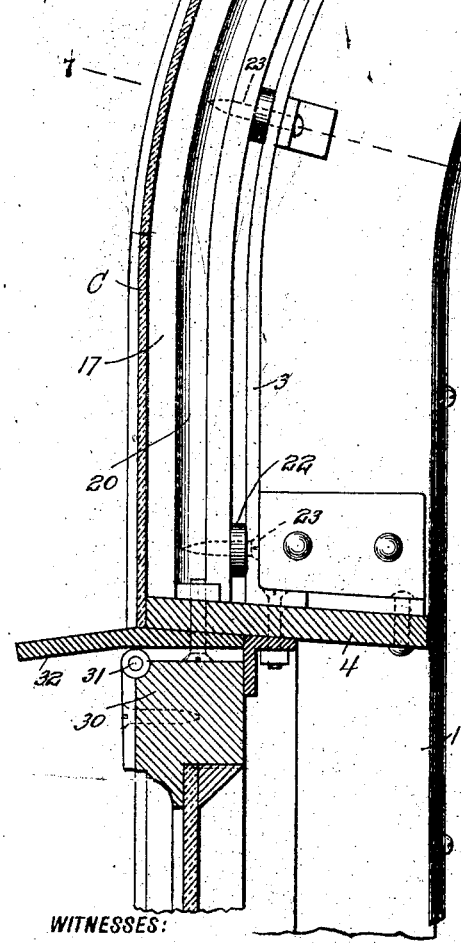
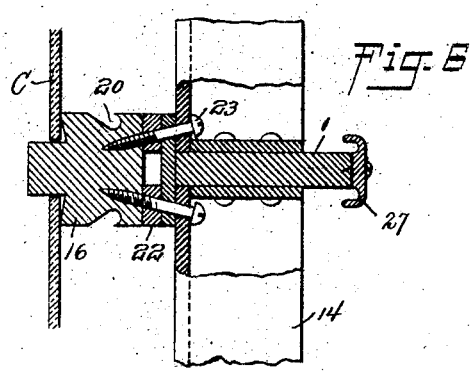
WITNESSES:
William P. Goebel
E. Bradway
INVENTOR
Augustus Eichhorn
BY
ATTORNEYS

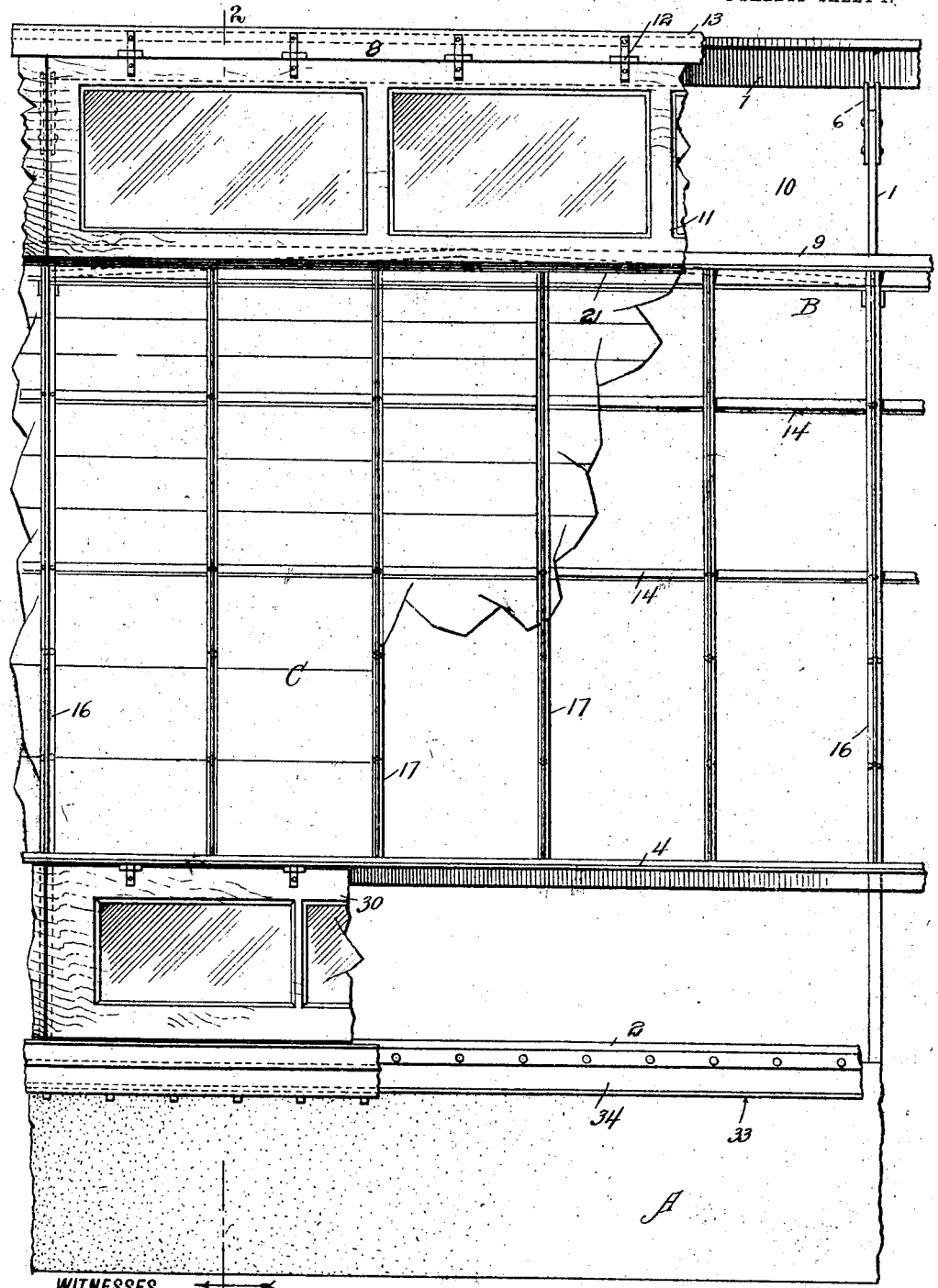

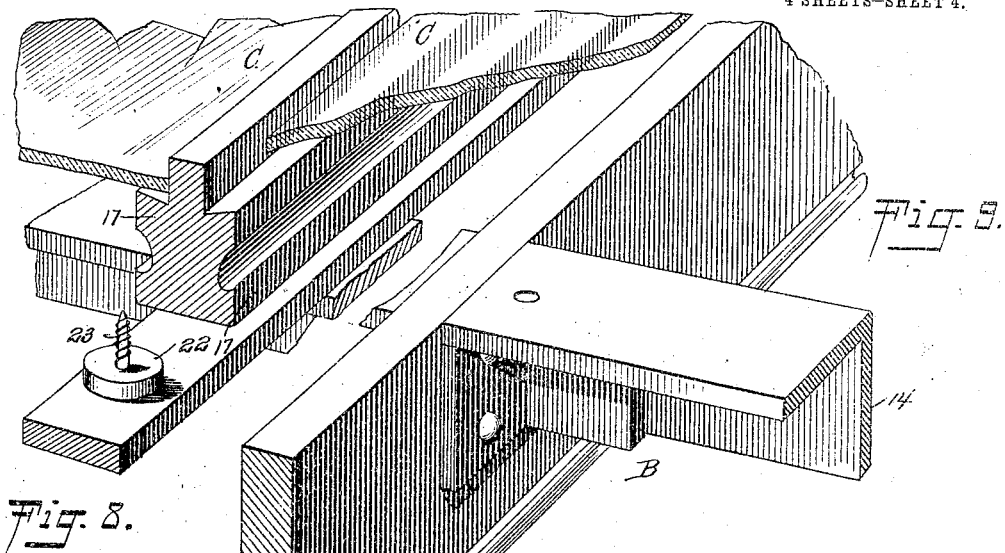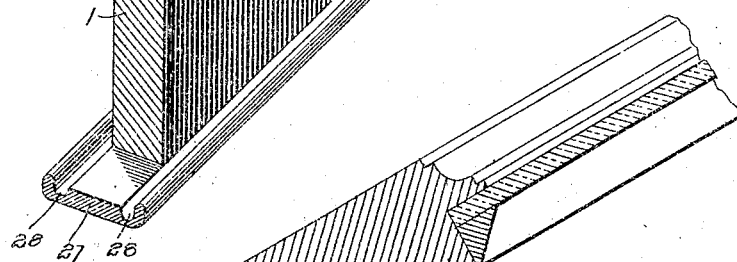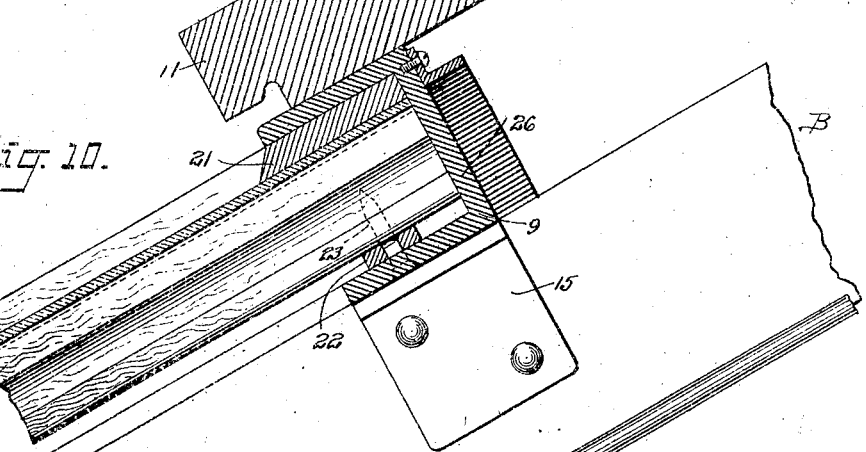

UNITED STATES PATENT OFFICE.

AUGUSTUS EICHHORN, OF ORANGE, NEW JERSEY.

GREENHOUSE CONSTRUCTION.

1,101,418.  Specification of Letters Patent. Patented June 23, 1914.

Application filed July 5, 1913. Serial No. 777,577.

*To all whom it may concern:*

Be it known that I, AUGUSTUS EICHHORN, a citizen of the United States, and a resident of Orange, in the county of Essex and State of New Jersey, have invented a new and Improved Greenhouse Construction, of which the following is a full, clear, and exact description.

This invention relates to greenhouse and conservatory constructions and it has for its general objects to provide an improved structure which is of extremely durable and substantial design, due to the fact that the entire framework is made of iron and only sufficient wood is employed to carry the glass panes or lights, so that the glass will not be cracked or broken by the changes in dimension of the greenhouse under the expansion and contraction of the metal parts.
A specific object of the invention is to so arrange the pane-carrying bars with respect to the metal framework that the bars are approximately wholly out of contact with the latter but firmly secured thereto, the isolation of the wood from the metal being advantageous, in that the life of the wood is greatly prolonged.

Another object of the invention is to provide a greenhouse structure in which the bottom ventilators are arranged above the masonry forming the side walls and in the metal framework of the greenhouse, which latter may also have simple or compound curved eaves if desired.
A further object is the provision of an improved ridge consisting of a T-shaped ridge-piece and a channel cap disposed thereover and to which channel cap the upper ventilators are hinged in such a manner that the cap effectively covers the upper edges of the ventilators, making weather tight joints.

Another object is the employment of channel or box headers for receiving the upper ends of the pane-carrying wooden bars, which headers form plates on which the upper ventilators rest when in closed position.

Another object is the provision of an iron framework consisting of principal and common rafters and purlins, with pane-holding bars secured to the rafters by common wood screws or the like, with the interposition of brass or other washers between the wooden pane-holding bars and rafters, so as to maintain the bars out of contact with the metal structure and provide for the free circulation of air under the bars.

With these objects in view, and others as will appear as the description proceeds, the invention comprises various novel features of construction and arrangement of parts which will be more fully described hereinafter and set forth particularly in the claims appended hereto.

In the accompanying drawings, which illustrate one embodiment of the invention, and wherein similar reference characters are employed to designate corresponding parts throughout the several views, Figure 1 is a fragmentary view of a side of a greenhouse constructed according to the present invention; Fig. 2 is a vertical section on the line 2—2 of Fig. 1; Fig. 3 is an enlarged sectional view on the line 3—3 of Fig. 2; Fig. 4 is an enlarged view of the eave portion of a main rafter; Fig. 5 is a sectional view taken through the wooden glass-holding bar and a rafter strip thereunder, and showing the means for connecting them together and to a purlin; Fig. 6 is a section on the line 5—5 of Fig. 4, to show the manner of securing the pane-holding bars to the metal structure at the main rafters; Fig. 7 is a sectional view on the line 7—7 of Fig. 4, to show the manner of connecting the pane-holding bars to the principal rafters at points intermediate the purlin; Fig. 8 is a fragmentary perspective view of one of the common rafters and adjacent pane-holding bars; Fig. 9 is a fragmentary perspective view of a rafter, purlin and gutter or drain strip on the rafter; and Fig. 10 is an enlarged sectional view of the box header for the pane-holding bar and the relation of said header to the main rafters and upper ventilators.

Referring to the drawing, A designates the brick or other masonry wall of the greenhouse, and B is a metal framework forming the superstructure of the greenhouse. This superstructure comprises principal rafters 1 resting on cast iron sills 2, and common rafters or strips 3, which have their lower ends resting on a pole plate 4 fastened to the main rafters at a suitable elevation above the sill 2. The upper ends of the principal rafters at one side of the greenhouse are connected with corresponding principal rafters at the opposite side by plates 5 which form the base portions of king posts 6 that support the ridge piece or plate 7, the latter being of T-shaped cross-section and having disposed over the top thereof a channel cap 8. Extending transversely to the principal rafters at a suitable distance below the ridge of the greenhouse are channel or box headers 9 between which and the ridge at both sides of the latter are formed ventilating openings 10 that are adapted to be closed by upper ventilators or sashes 11. These ventilators may be of such length as to extend from one main rafter to another and they are connected at their upper edges by hinges 12 to the side webs or members 13 of the channel cap 8, the upper edges of the ventilators extending under the side members 13 of this channel cap, so that a weather-tight joint is provided. Furthermore, the upper edges of the ventilators are so shaped as to close snugly against the central web of the T-shaped ridge-piece 7.

Between the principal rafters extend purlins 14 which have their ends secured to the latter, and these purlins serve to support the common rafters 3 at points intermediate the pole plate 4 and headers 9, which headers are secured to the principal rafters in any suitable manner, as, for instance, by brackets 15, Fig. 2.

The metal structure formed by the principal and common rafters, purlins, ridge and sill is rigid and permanent, and the means for holding the glass panes or lights C consists of wooden bars 16 and 17 such as are commonly employed in greenhouses. The bars 16 are arranged at the principal rafters and hence are wider than the bars 17 arranged at the common rafters. These bars may be curved by steaming, or any other process, where the eaves of the greenhouse are simple or compound curves. The lower ends of the glass-holding bars 16 and 17 bear on the pole plates 4, while the upper ends of the bars are received in the chambers of the box headers 9. The lights 3 are laid in the usual manner in putty 18 placed in the rabbets 19 of the bars, as clearly shown in Figs. 5 to 7, and the edges of the bars may be formed with drain channels if desired. The panes of glass at the upper ends of the bars 16 and 17 are inserted in the headers 9, and the entire space between adjacent glass-holding bars and between the glass and upper flange of the header 9 is filled with putty 21, so that a tight joint is obtained, as clearly shown in Fig. 2. The wooden bars 16 and 17 are held out of contact from the rafters by brass or other separators 22 in the form of washers through which extend the screws 23 or other fasteners, which hold the bars on the rafters.

As shown clearly in Fig. 8, the common rafters are strips of metal disposed with their flat surfaces parallel with the glass of the greenhouse or parallel with the under surface of the glass-holding bars, and the screws 23 pass centrally through the common rafters and screw centrally into the glass-holding bars 17. Where the common rafters cross the purlins, as shown in Fig. 5, the screws 23 pass through openings in the purlins, and if desired the screws at these points may be longer than those used at other points. In order to secure the wider bars 16 to the principal rafters the latter may be provided with L-shaped brackets 24, Fig. 7, for receiving the screws 23 which fasten the wooden bars to the principal rafters. Where the purlins are joined with the principal rafters, as in Fig. 6, the brackets 24 are unnecessary, since the screws 23 will pass through openings in the purlins. By the use of the separators 22 the wooden bars are held out of contact with the metal framework so that air can freely circulate under the bars and keep the same comparatively dry, and as a result the wooden part of the greenhouse, although easily removable when renewal is required, is capable of enduring for a long time.

The vapor that condenses on the upper ventilators 11 is adapted to be collected by a drip member or shed 26, which, as shown in Figs. 1, 2, 3 and 10 is fastened to the header 9 sloping from the middle thereof downwardly to the principal rafters upon which the water is discharged by the said drip member 26. On the bottom edge of each principal rafter is a drain or gutter strip 27 which has opposite edges projecting from the sides of the principal rafters and formed into channels or gutters 27 down which the water runs to discharge on the sills 2.

By reference to Figs. 1, 2 and 4 it will be seen that ventilating openings are formed between the sill 2 and pole plate 4 and between principal rafters 1, which openings are provided with ventilators 30 that are connected by hinges 31 to the metal framework. Over the ventilators 31 are mounted strips 32 that form sheds for directing rain that falls down the glass outwardly to drip into the gutter 33. The gutter has a back flange 34 that is bolted or otherwise fastened to the sill 2, this back portion 34 of the gutter being an angle iron strip, and to the horizontal flange thereof is secured a front member 35 of any desired cross-sectional form. A gutter of this character is comparatively inexpensive to make and is supported directly by the sill.

From the foregoing description taken in connection with the accompanying drawings, the advantages of the method of operation and of the apparatus shown will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A greenhouse construction comprising a framework consisting of principal and common rafters and purlins, glass-holding bars having their full length disposed over the rafters, means for securing certain of the bars to the principal rafters, fasteners securing the remaining bars to the common rafters, certain of the said fasteners passing through the purlins for fastening the common rafters thereto, and means for separating the said bars from the rafters to provide therebetween air circulating spaces.

2. A greenhouse construction including a ridge composed of a T-shaped ridge plate and a channel cap applied thereto, rafters connected with the ridge, and ventilators fastened to and having their upper edges extending under the side members of the cap.

3. A greenhouse construction including a ridge composed of a T-shaped ridge plate and a channel cap applied thereto, rafters connected with the ridge, ventilators, and hinges connecting the ventilators with the side members of the cap and holding the ventilators when in closed position with their upper edges under the side members of the cap.

4. A greenhouse construction comprising a ridge composed of a T-shaped ridge plate and a channel cap placed with its open bottom side over the top of the ridge plate, whereby its side members extend downwardly along the sides of the ridge plate, rafters connected with the ridge plate, and ventilators fastened to the ridge with their upper edges extending under the side members of the cap, whereby said side members form means for shedding the rain from the joints between the upper edges of the ventilators and ridge plate.

In testimony whereof I have signed my name to this specification in the presence of two subscribing witnesses.

AUGUSTUS EICHHORN.

Witnesses:
 C. BRADLAY,
 PHILIP D. ROLLHAUS.